US011245509B2

(12) United States Patent
Golitschek Edler von Elbwart et al.

(10) Patent No.: US 11,245,509 B2
(45) Date of Patent: *Feb. 8, 2022

(54) CONTROL CHANNEL SIGNALLING FOR TRIGGERING THE INDEPENDENT TRANSMISSION OF A CHANNEL QUALITY INDICATOR

(71) Applicant: Godo Kaisha IP Bridge 1, Tokyo (JP)

(72) Inventors: Alexander Golitschek Edler von Elbwart, Darmstadt (DE); Christian Wengerter, Klienheubach (DE); Joachim Löhr, Wiesbaden (DE)

(73) Assignee: Godo Kaisha IP Bridge 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,977

(22) Filed: Jan. 9, 2020

(65) Prior Publication Data

US 2020/0145168 A1 May 7, 2020

Related U.S. Application Data

(63) Continuation of application No. 16/020,797, filed on Jun. 27, 2018, now Pat. No. 10,567,139, which is a
(Continued)

(30) Foreign Application Priority Data

May 6, 2008 (EP) .................................. 08008539

(51) Int. Cl.
*H04B 7/00* (2006.01)
*H04L 5/00* (2006.01)
(Continued)

(52) U.S. Cl.
CPC ......... *H04L 5/0057* (2013.01); *H04B 7/0617* (2013.01); *H04L 1/0026* (2013.01);
(Continued)

(58) Field of Classification Search
CPC ......... H04W 4/18; H04W 4/20; H04W 72/02; H04W 72/04; H04W 72/42;
(Continued)

(56) References Cited

U.S. PATENT DOCUMENTS 7,289,452 B2  10/2007  Malkamaki
7,319,718 B2   1/2008  Roh et al.
(Continued)

FOREIGN PATENT DOCUMENTS

RU  2 272 357 C2  3/2006
RU  2 274 955 C2  4/2006
(Continued)

OTHER PUBLICATIONS

"3rd Generation Partnership Project; Technical Specification Group Radio Access Network; Physical layer aspects for evolved Universal Terrestrial Radio Access (UTRA) (Release 7)," Technical Report, 3GPP TR 25.814, V7.1.0, Sep. 2006, 132 pages.
(Continued)

*Primary Examiner* — Dmitry Levitan
(74) *Attorney, Agent, or Firm* — Seed IP Law Group LLP

(57) ABSTRACT

A communication apparatus has a receiver and a transmitter. The receiver, in operation receives a control signal including a Modulation and Coding Scheme (MCS) Index, a channel quality indicator (CQI) trigger and information indicating uplink resource blocks. The transmitter in operation, determines whether to multiplex an aperiodic CQI report with data in an uplink signal based on the MCS Index, the channel quality indicator trigger, the information indicating uplink resource blocks, and a threshold number of resource blocks, and transmits the uplink signal.

14 Claims, 4 Drawing Sheets

Related U.S. Application Data continuation of application No. 15/205,996, filed on Jul. 8, 2016, now Pat. No. 10,033,506, which is a continuation of application No. 14/818,096, filed on Aug. 4, 2015, now Pat. No. 9,420,566, which is a continuation of application No. 14/457,924, filed on Aug. 12, 2014, now Pat. No. 9,131,484, which is a continuation of application No. 13/743,707, filed on Jan. 17, 2013, now Pat. No. 8,855,031, which is a continuation of application No. 12/989,017, filed as application No. PCT/EP2009/002422 on Apr. 2, 2009, now Pat. No. 8,385,239.

(51) Int. Cl.
  *H04W 74/02* (2009.01)
  *H04L 1/00* (2006.01)
  *H04L 1/18* (2006.01)
  *H04W 72/04* (2009.01)
  *H04B 7/06* (2006.01)
  *H04L 12/26* (2006.01)
  *H04W 28/14* (2009.01)
  *H04W 72/08* (2009.01)
  *H04W 88/02* (2009.01)
  *H04W 88/08* (2009.01)

(52) U.S. Cl.
  CPC .......... *H04L 1/0027* (2013.01); *H04L 1/0029* (2013.01); *H04L 1/1812* (2013.01); *H04L 1/1819* (2013.01); *H04L 5/0007* (2013.01); *H04L 5/0021* (2013.01); *H04L 43/16* (2013.01); *H04W 28/14* (2013.01); *H04W 72/042* (2013.01); *H04W 72/0406* (2013.01); *H04W 72/0413* (2013.01); *H04W 74/02* (2013.01); *H04L 1/0007* (2013.01); *H04L 1/0025* (2013.01); *H04W 72/085* (2013.01); *H04W 88/02* (2013.01); *H04W 88/08* (2013.01)

(58) Field of Classification Search
  CPC ............... H04W 72/044; H04W 72/08; H04W 72/1263; H04W 72/1278
  USPC .................................. 370/310, 328, 329, 431
  See application file for complete search history.

(56) References Cited

U.S. PATENT DOCUMENTS

| | | | |
|---|---|---|---|
| 7,885,211 B2 | 2/2011 | Shen et al. | |
| 7,990,919 B2 | 8/2011 | Kotecha | |
| 8,023,900 B2 | 9/2011 | Asanuma et al. | |
| 8,045,992 B2* | 10/2011 | Vannithamby | H04L 1/0026 455/452.2 |
| 8,149,809 B2* | 4/2012 | Kazmi | H04L 1/0026 370/341 |
| 8,169,928 B2 | 5/2012 | Iwamura et al. | |
| 8,320,263 B2 | 11/2012 | Kurose et al. | |
| 8,369,299 B2 | 2/2013 | Malladi et al. | |
| 8,385,239 B2 | 2/2013 | Golitschek Edler von Elbwart et al. | |
| 8,422,439 B2 | 4/2013 | Nimbalker et al. | |
| 8,509,168 B2 | 8/2013 | Kim et al. | |
| 8,670,376 B2 | 3/2014 | Damnjanovic et al. | |
| 8,699,602 B2* | 4/2014 | Chen | H04L 5/0023 375/267 |
| 8,831,116 B2 | 9/2014 | Xiao et al. | |
| 8,855,031 B2 | 10/2014 | Golitschek Edler von Elbwart et al. | |
| 8,902,775 B2 | 12/2014 | Jersenius et al. | |
| 8,942,164 B2 | 1/2015 | Onggosanusi et al. | |
| 2003/0174669 A1 | 9/2003 | Roh et al. | |
| 2004/0081181 A1 | 4/2004 | Malkamaki | |
| 2007/0014273 A1 | 1/2007 | Kuperschmidt et al. | |
| 2007/0149132 A1 | 6/2007 | Li et al. | |
| 2008/0095185 A1 | 4/2008 | DiGirolamo et al. | |
| 2009/0203383 A1 | 8/2009 | Shen et al. | |
| 2009/0238121 A1 | 9/2009 | Kotecha | |
| 2010/0014500 A1 | 1/2010 | Lee et al. | |
| 2011/0002290 A1 | 1/2011 | Kim et al. | |
| 2014/0355543 A1 | 12/2014 | Golitschek Edler von Elbwart et al. | |

FOREIGN PATENT DOCUMENTS

| | | | |
|---|---|---|---|
| WO | 2004/029806 A1 | 4/2004 | |
| WO | 2005/060132 A1 | 6/2005 | |
| WO | 2008/135238 A1 | 11/2008 | |

OTHER PUBLICATIONS

"3rd Generation Partnership Project; Technical Specification Group Radio Access Network; Multiplexing and channel coding (FDD) (Release 7)," Technical Specification, 3GPP TS 25.212, V7.6.0, Sep. 2007, 103 pages.

"3rd Generation Partnership Project; Technical Specification Group Radio Access Network; High Speed Downlink Packet Access (HSDPA); Overall description; Stage 2 (Release 7)," Technical Specification, 3GPP TS 25.308, V7.4.0, Sep. 2007, 50 pages.

"3rd Generation Partnership Project; Technical Specification Group Radio Access Network; Evolved Universal Terrestrial Radio Access (E-UTRA); Physical Channels and Modulation (Release 8)," Technical Specification, 3GPP TS 36.211, V8.2.0, Mar. 2008, 65 pages.

"3rd Generation Partnership Project; Technical Specification Group Radio Access Network; Evolved Universal Terrestrial Radio Access (E-UTRA); Physical layer procedures (Release 8)," Technical Specification, 3GPP TS 36.213, V8.2.0, Mar. 2008, 30 pages.

Ericsson (Discussion moderator), "Notes from offline discussions on PDCCH contents," R1-073870, Agenda Item: 7.2.3, TSG-RAN WG1 #50, Athens, Greece, Aug. 20-24, 2007, 3 pages.

Ericsson et al., "Refinements on Signalling of CQI/Precoding Information on PDCCH," R1-081682, Agenda Item: 6.1.3, 3GPP TSG-RAN WG1 #52bis, Shenzhen, China, Mar. 31-Apr. 4, 2008, 4 pages.

International Search Report, dated Oct. 2, 2009, for International Application No. PCT/EP2009/002422, 4 pages.

Jhong et al., "CDMA Systems Engineering Handbook," XP002503419, Jan. 1998, pp. 360-369.

Motorola, "TBS and MCS Table Generation and Signaling for E-UTRA," R1-080072, Agenda Item: 6.1.3, 3GPP TSG RAN1 #51bis, Seville, Spain, Jan. 14-18, 2008, 5 pages.

Nokia, Nokia Siemens Networks, "CQI Trigger Mechanism," R1-073680, Agenda Item: 7.4.5, 3GPP TSG-RAN WG1 Meeting #50, Athens, Greece, Aug. 20-24, 2007, 6 pages.

Notice of Reason for Rejection, dated Sep. 18, 2012, for corresponding Japanese Application No. 2011-507801, 7 pages.

NTT DoCoMo, Ericsson, Fujitsu, Mitsubishi Electric, NEC, Panasonic, Sharp, Toshiba Corporation, "Comparison between RB-level and Sub-carrier-level Distributed Transmission for Shared Data Channel in E-UTRA Downlink," R1-062089 (Original R1-061182), Agenda Item: 8.2, 3GPP TSG RAN WG1 Meeting #46, Tallinn, Estonia, Aug. 28-Sep. 1, 2006, 14 pages.

Panasonic, "CQI Feedback Control and Content in E-UTRA," R1-071524, Agenda Item: 7.11.1, 3GPP TSG-RAN WG1 Meeting #48bis, St. Julians, Malta, Mar. 26-30, 2007, 4 pages.

Panasonic, "CQI Feedback Control and Content in E-UTRA," R1-072077, Agenda Item: 7.13.2, 3GPP TSG-RAN WG1 Meeting #49, Kobe, Japan, May 7-11, 2007, 5 pages.

Panasonic, "PDCCH contents and formats," R1-082079, Agenda Item: 7.1.1, 3GPP TSG-RAN WG1 Meeting #53, Kansas City, USA, May 5-9, 2008, 4 pages.

Panasonic, "PDCCH transport block signaling," R1-081196, Agenda Item: 6.1.3, 3GPP TSG-RAN WG1 Meeting #52bis, Shenzhen, China, Mar. 31-Apr. 4, 2008, 9 pages.

(56) References Cited

OTHER PUBLICATIONS

Panasonic, Ericsson, Qualcomm Europe, Samsung, "Signaling of CQI only on PUSCH," R1-082190, Agenda Item: 7.1.1, 3GPP TSG-RAN WG1 Meeting #53, Kansas City, USA, May 5-9, 2008, 1 page.
Philips, "Control of CQI feedback signalling in E-UTRA," Tdoc R1-071093, Agenda Item: 6.9.1, 3GPP TSG RAN WG1 Meeting #48, St. Louis, USA, Feb. 12-16, 2007, 3 pages.
Russian Office Action dated May 27, 2013, for corresponding RU Application No. 2010149758/08(071921), 11 pages.
Samsung, "Downlink Link Adaptation and Related Control Signaling," R1-073105, Agenda Item: 5.13.1, 3GPP TSG RAN WG1 Meeting #49bis, Orlando, USA, Jun. 25-29, 2007, 6 pages.
Texas Instruments, "CQI Reporting on PUSCH," R1-081383, Agenda Item: 6.3.4, 3GPP TSG RAN WG1 #52bis, Shenzhen, China, Mar. 31-Apr. 4, 2008, 4 pages.
Toskala et al., "High-speed Downlink Packet Access," in Harri Holma et al. (eds.), WCDMA for UMTS, Third Edition, John Wiley & Sons, Ltd., 2004, pp. 307-313.

\* cited by examiner

CONTROL CHANNEL SIGNALLING FOR TRIGGERING THE INDEPENDENT TRANSMISSION OF A CHANNEL QUALITY INDICATOR

FIELD OF THE INVENTION

The invention relates to a method for providing control signalling in a communication system comprising a base station and a terminal, said method being performed by said base station. Further, it relates to a method performed by said terminal. Moreover, the invention provides a corresponding base station and a terminal.

TECHNICAL BACKGROUND

Packet-Scheduling and Shared Channel Transmission

In wireless communication systems employing packet-scheduling, at least part of the air-interface resources are assigned dynamically to different users (mobile stations—MS or user equipments—UE). Those dynamically allocated resources are typically mapped to at least one Physical Uplink or Downlink Shared CHannel (PUSCH or PDSCH). A PUSCH or PDSCH may, for example, have one of the following configurations:

- One or multiple codes in a CDMA (Code Division Multiple Access) system are dynamically shared between multiple MS.
- One or multiple subcarriers (subbands) in an OFDMA (Orthogonal Frequency Division Multiple Access) system are dynamically shared between multiple MS.
- Combinations of the above in an OFCDMA (Orthogonal Frequency Code Division Multiplex Access) or a MC-CDMA (Multi Carrier-Code Division Multiple Access) system are dynamically shared between multiple MS.

FIG. 1 shows a packet-scheduling system on a shared channel for systems with a single shared data channel. A sub-frame (also referred to as a time slot) reflects the smallest interval at which the scheduler (e.g., the Physical Layer or MAC Layer Scheduler) performs the dynamic resource allocation (DRA). In FIG. 1, a TTI (transmission time interval) equal to one sub-frame is assumed. Generally a TTI may span over multiple sub-frames.

Further, the smallest unit of radio resources (also referred to as a resource block or resource unit), which can be allocated in OFDM systems, is typically defined by one sub-frame in time domain and by one subcarrier/subband in the frequency domain. Similarly, in a CDMA system this smallest unit of radio resources is defined by a sub-frame in the time domain and a code in the code domain.

In OFCDMA or MC-CDMA systems, this smallest unit is defined by one sub-frame in time domain, by one subcarrier/subband in the frequency domain and one code in the code domain. Note that dynamic resource allocation may be performed in time domain and in code/frequency domain.

The main benefits of packet-scheduling are the multi-user diversity gain by time domain scheduling (TDS) and dynamic user rate adaptation.

Assuming that the channel conditions of the users change over time due to fast and slow fading, at a given time instant the scheduler can assign available resources (codes in case of CDMA, subcarriers/subbands in case of OFDMA) to users having good channel conditions in time domain scheduling.

Specifics of DRA and Shared Channel Transmission in OFDMA

Additionally to exploiting multi-user diversity in time domain by Time Domain Scheduling (TDS), in OFDMA multi-user diversity can also be exploited in frequency domain by Frequency Domain Scheduling (FDS). This is because the OFDM signal is in frequency domain constructed out of multiple narrowband subcarriers (typically grouped into subbands), which can be assigned dynamically to different users. By this, the frequency selective channel properties due to multi-path propagation can be exploited to schedule users on frequencies (subcarriers/subbands) on which they have a good channel quality (multi-user diversity in frequency domain).

For practical reasons in an OFDMA system the bandwidth is divided into multiple subbands, which consist out of multiple subcarriers. I.e., the smallest unit on which a user may be allocated would have a bandwidth of one subband and a duration of one slot or one sub-frame (which may correspond to one or multiple OFDM symbols), which is denoted as a resource block (RB). Typically, a subband consists of consecutive subcarriers. However, in some cases it is desired to form a subband out of distributed non-consecutive subcarriers. A scheduler may also allocate a user over multiple consecutive or non-consecutive subbands and/or sub-frames.

For the 3GPP Long Term Evolution (3GPP TR 25.814: "Physical Layer Aspects for Evolved UTRA", Release 7, v. 7.1.0, October 2006—incorporated herein by reference), a 10 MHz system (normal cyclic prefix) may consist out of 600 subcarriers with a subcarrier spacing of 15 kHz. The 600 subcarriers may then be grouped into 50 subbands (a 12 adjacent subcarriers), each subband occupying a bandwidth of 180 kHz. Assuming, that a slot has a duration of 0.5 ms, a resource block (RB) spans over 180 kHz and 0.5 ms according to this example.

In order to exploit multi-user diversity and to achieve scheduling gain in frequency domain, the data for a given user should be allocated on resource blocks on which the users have a good channel condition. Typically, those resource blocks are close to each other and therefore, this transmission mode is also denoted as localized mode (LM). However, it cannot be generally assumed that the scheduling entity is aware of the prevalent channel conditions. Therefore, it may be necessary to transmit such Channel Quality Indication (CQI) to the scheduling entity, e.g., from a terminal to a base station. Such information may comprise further parameters related to multiple antenna transmission, such as a Precoding Patrix Indicator (PMI) and a Rank Indicator (RI). Such CQI, PMI, RI therefore should represent the conditions that are applicable to the downlink transmission, i.e., from a base station to at least one terminal.

An example for a localized mode channel structure is shown in FIG. 2. In this example neighboring resource blocks are assigned to four mobile stations (MS1 to MS4) in the time domain and frequency domain. Each resource block consists of a portion for carrying Layer 1 and/or Layer 2 control signaling (L1/L2 control signaling) and a portion carrying the user data for the mobile stations.

Alternatively, the users may be allocated in a distributed mode (DM) as shown in FIG. 3. In this configuration, a user (mobile station) is allocated on multiple resource blocks, which are distributed over a range of resource blocks. In distributed mode a number of different implementation options are possible. In the example shown in FIG. 3, a pair of users (MSs 1/2 and MSs 3/4) shares the same resource blocks. Several further possible exemplary implementation options may be found in 3GPP RAN WG #1 Tdoc R1-062089, "Comparison between RB-level and Sub-carrier-level Distributed Transmission for Shared Data Channel in E-UTRA Downlink", August 2006 (incorporated herein by reference).

It should be noted, that multiplexing of localized mode and distributed mode within a sub-frame is possible, where the amount of resources (RBs) allocated to localized mode and distributed mode may be fixed, semi-static (constant for tens/hundreds of sub-frames) or even dynamic (different from sub-frame to sub-frame).

In localized mode as well as in distributed mode in—a given sub-frame—one or multiple data blocks (which are inter alia referred to as transport-blocks) may be allocated separately to the same user (mobile station) on different resource blocks, which may or may not belong to the same service or Automatic Repeat reQuest (ARQ) process. Logically, this can be understood as allocating different users.

L1/L2 Control Signaling

In order to provide sufficient side information to correctly receive or transmit data in systems employing packet scheduling, so-called L1/L2 control signaling (Physical Downlink Control CHannel—PDCCH) needs to be transmitted. Typical operation mechanisms for downlink and uplink data transmission are discussed below.

Downlink Data Transmission

Along with the downlink packet data transmission, in existing implementations using a shared downlink channel, such as 3GPP-based High Speed Downlink Packet Access (HSDPA), L1/L2 control signaling is typically transmitted on a separate physical (control) channel.

This L1/L2 control signaling typically contains information on the physical resource(s) on which the downlink data is transmitted (e.g., subcarriers or subcarrier blocks in case of OFDM, codes in case of CDMA). This information allows the mobile station (receiver) to identify the resources on which the data is transmitted. Another parameter in the control signaling is the transport format used for the transmission of the downlink data.

Typically, there are several possibilities to indicate the transport format. For example, the transport block (TB) size of the data (payload size, information bits size), the Modulation and Coding Scheme (MCS) level, the Spectral Efficiency, the code rate, etc. may be signaled to indicate the transport format (TF). This information (usually together with the resource allocation) allows the mobile station (receiver) to identify the number of information bits, the modulation scheme and the code rate in order to start the demodulation, the de-rate-matching and the decoding process. In some cases the modulation scheme maybe signaled explicitly.

In addition, in systems employing Hybrid ARQ (HARQ), HARQ information may also form part of the L1/L2 signaling. This HARQ information typically indicates the HARQ process number, which allows the mobile station to identify the Hybrid ARQ process on which the data is mapped, the sequence number or new data indicator, allowing the mobile station to identify if the transmission is a new packet or a retransmitted packet and a redundancy and/or constellation version. The redundancy version and/or constellation version tells the mobile station, which HARQ redundancy version is used (required for de-rate-matching) and/or which modulation constellation version is used (required for demodulation).

A further parameter in the HARQ information is typically the UE Identity (UE ID) for identifying the mobile station to receive the L1/L2 control signaling. In typical implementations this information is used to mask the CRC (cyclic redundancy check) of the L1/L2 control signaling in order to prevent other mobile stations to read this information.

The table below (Table 1) illustrates an example of a L1/L2 control channel signal structure for downlink scheduling as known from 3GPP TR 25.814 (see section 7.1.1.2.3—FFS=for further study):

TABLE 1

| | Field | Size | Comment |
| --- | --- | --- | --- |
| Cat. 1 (Resource indication) | ID (UE or group specific) | [8-9] | Indicates the UE (or group of UEs) for which the data transmission is intended. |
| | Resource assignment | FFS | Indicates which (virtual) resource units (and layers in case of multi-layer transmission) the UE(s) shall demodulate. |
| | Duration of assignment | 2-3 | The duration for which the assignment is valid, could also be used to control the TTI or persistent scheduling. |
| Cat 2. (transport format) | Multi-antenna related information | FFS | Content depends on the MIMO/beam-forming schemes selected. |
| | Modulation scheme | 2 | QPSK, 16QAM, 64QAM. In case of multi-layer transmission, multiple instances may be required. |
| | Payload size | 6 | Interpretation could depend on e.g., modulation scheme and the number of assigned resource units (c.f. HSDPA). In case of multi-layer transmission, multiple instances may be required. |
| Cat. 3 (HARQ) | If asynchronous hybrid ARQ is adopted | Hybrid ARQ process number | 3 | Indicates the hybrid ARQ process the current transmission is addressing. |
| | | Redundancy version | 2 | To support incremental redundancy. |
| | | New data indicator | 1 | To handle soft buffer clearing. |
| | If synchronous hybrid ARQ is adopted | Retransmission sequence number | 2 | Used to derive redundancy version (to support incremental redundancy) and 'new data indicator' (to handle soft buffer clearing). |

Uplink Data Transmission

Similarly, also for uplink transmissions, L1/L2 signaling is provided on the downlink to the transmitters in order to inform them on the parameters for the uplink transmission. Essentially, the L1/L2 control channel signal is partly similar to the one for downlink transmissions. It typically indicates the physical resource(s) on which the UE should transmit the data (e.g., subcarriers or subcarrier blocks in case of OFDM, codes in case of CDMA) and a transport format the mobile station should use for uplink transmission. Further, the L1/L2 control information may also comprise Hybrid ARQ information, indicating the HARQ process number, the sequence number and/or new data indicator, and further the redundancy version and/or constellation version. In addition, there may be a UE Identity (UE ID) comprised in the control signaling.

Variants

There are several different flavors how to exactly transmit the information pieces mentioned above. Moreover, the L1/L2 control information may also contain additional information or may omit some of the information. For example, the HARQ process number may not be needed in case of using no or a synchronous HARQ protocol. Similarly, the redundancy and/or constellation version may not be needed, if, for example, Chase Combining is used (i.e., always the same redundancy and/or constellation version is transmitted) or if the sequence of redundancy and/or constellation versions is predefined.

Another variant may be to additionally include power control information in the control signaling or MIMO (multiple input-multiple output) related control information, such as e.g., pre-coding information. In case of multi-codeword MIMO transmission transport format and/or HARQ information for multiple code words may be included.

In case of uplink data transmission, part or all of the information listed above may be signaled on uplink, instead of on the downlink. For example, the base station may only define the physical resource(s) on which a given mobile station shall transmit. Accordingly, the mobile station may select and signal the transport format, modulation scheme and/or HARQ parameters on the uplink. Which parts of the L1/L2 control information is signaled on the uplink and which proportion is signaled on the downlink is typically a design issue and depends on the view how much control should be carried out by the network and how much autonomy should be left to the mobile station.

The table below (Table 2) illustrates an example of a L1/L2 control channel signal structure for uplink scheduling as known from 3GPP TR 25.814 (see section 7.1.1.2.3—FFS=for further study):

TABLE 2

| Field | | Size | Comment |
|---|---|---|---|
| Rce assign | ID (US or group specific) | [8-9] | Indicates the US (or group of UEs) for which the grant is intended |
| | Resource assignment | FFS | Indicates which uplink resources, localized or distributed, the UE is allowed to use for uplink data transmission. |
| | Duration of assignment | 2-3 | The duration for which the assignment is valid. The use for other purposes, e.g., to control persistent scheduling 'per process' operation, or TTI length, is FFS. |
| TF | Transmission parameters | FFS | The uplink transmission parameters (modulation scheme, payload size, MIMO-related information, etc.) the UE shall use. If the UE is allowed to select (part of) the transport format, this field determines an upper limit of the transport format the UE may select. |

Another, more recent suggestion of a L1/L2 control signaling structure for uplink and downlink transmission may be found in 3GPP TSG-RAN WG1 #50 Tdoc. R1-073870, "Notes from offline discussions on PDCCH contents", August 2007, incorporated herein by reference.

As indicated above, L1/L2 control signaling has been defined for systems that are already deployed to in different countries, such as, for example, 3GPP HSDPA. For details on 3GPP HSDPA it is therefore referred to 3GPP TS 25.308, "High Speed Downlink Packet Access (HSDPA); Overall description; Stage 2", version 7.4.0, September 2007 and Harri Holma and Antti Toskala, "WCDMA for UMTS, Radio Access For Third Generation Mobile Communications", Third Edition, John Wiley & Sons, Ltd., 2004, chapters 11.1 to 11.5, for further reading.

As described in section 4.6 of 3GPP TS 25.212, "Multiplexing and Channel Coding (FDD)", version 7.6.0, September 2007, in HSDPA the "Transport Format" (TF) (Transport-block size information (6 bits)), the "Redundancy and Constellation Version" (RV/CV) (2 bits) and the "New Data Indicator" (NDI) (1 bit) are signaled separately by in total 9 bits. It should be noted that the NDI is actually serving as a 1-bit HARQ Sequence Number (SN), i.e., the value is toggled with each new transport-block to be transmitted.

Channel Quality Indication (CQI)

The section 7.2 of 3GPP TS 36.213 "UE procedure for reporting channel quality indication (CQI), precoding matrix indicator (PMI) and rank indication (RI)" Version 8.2.0, March 2008 defines the reporting of Channel Quality Indicators.

The time and frequency resources that can be used by the UE to report CQI, PMI, and RI are controlled by the eNodeB. For spatial multiplexing, as given in 3GPP TS 36.211: "Evolved Universal Terrestrial Radio Access (E-UTRA); Physical channels and modulation", the UE shall determine a RI corresponding to the number of useful transmission layers. For transmit diversity as given in the above-mentioned technical specifications, RI is equal to one.

CQI, PMI, and RI reporting is periodic or aperiodic. A UE transmits CQI, PMI, and RI reporting on a Physical Uplink Control CHannel (PUCCH) for sub-frames with no Physical Uplink Shared CHannel (PUSCH) allocation. A UE transmits CQI, PMI, and RI reporting on a PUSCH for those sub-frames with PUSCH allocation for:

a) scheduled PUSCH transmissions with or without an associated scheduling grant; or b) PUSCH transmissions with no UL-SCH (Uplink Shared Channel).

The CQI transmissions on PUCCH and PUSCH for various scheduling modes are summarized in the following Table 3, which shows the physical channels for aperiodic or periodic CQI reporting:

TABLE 3

| Scheduling Mode | Period CQI reporting channels | Aperiodic CQI reporting channel |
|---|---|---|
| Frequency non-selective | PUCCH PUSCH | PUSCH |
| Frequency selective | PUCCH PUSCH | PUSCH |

In case both periodic and aperiodic reporting would occur in the same sub-frame, the UE shall only transmit the aperiodic report in that sub-frame.

Aperiodic/Periodic CQI/PMI/RI Reporting Using PUSCH

A UE shall perform aperiodic CQI, PMI and RI reporting using the PUSCH upon receiving an indication sent in the scheduling grant, hereafter also called channel quality indicator trigger signal. The aperiodic CQI report size and message format is given by the RRC (Radio Resource Control protocol). The minimum reporting interval for aperiodic reporting of CQI and PMI and RI is 1 sub-frame. The sub-band size for CQI shall be the same for transmitter-receiver configurations with and without precoding.

A UE is semi-statically configured by higher layers to feed back CQI and PMI and corresponding RI on the same PUSCH using one of the following reporting modes given in Table 4 and described below:

TABLE 4

| | | PMI Feedback Type | | |
|---|---|---|---|---|
| | | No PMI | Single PMI | Multiple PMI |
| Feedback Type PUSCH CQI | Wideband (wideband CQI) | | | Mode 1-2 |
| | UE Selected (subband CQI) | Mode 2-0 | Mode 2-1 | Mode 2-2 |
| | Higher Layer-configured (subband CQI) | Mode 3-0 | Mode 3-1 | Mode 3-2 |

Channel Quality Indicator (CQI) Definition

The number of entries in the CQI table for a single TX antenna is equal to 16, as given by Table 5 represented below, which shows a 4-bit CQI. A single CQI index corresponds to an index pointing to a value in the CQI table. The CQI index is defined in terms of a channel coding rate value and modulation scheme (QPSK, 16QAM, 64QAM).

Based on an unrestricted observation interval in time and frequency, the UE shall report the highest tabulated CQI index, for which a single PDSCH sub-frame could be received in a 2-slot downlink sub-frame (aligned, reference period ending z slots before the start of the first slot in which the reported CQI index is transmitted) and for which the transport block error probability would not exceed 0.1.

TABLE 5

| CQI Index | Modulation | Coding rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Precoding Matrix Indicator (PMI) definition

For closed-loop spatial multiplexing transmission, precoding feedback is used for channel dependent codebook based precoding and relies on UEs reporting precoding matrix indicator (PMI). A UE shall report PMI based on the feedback modes described above. Each PMI value corresponds to a codebook index given in Table 6.3.4.2.3-1 or Table 6.3.4.2.3-2 of 3GPP TS 36.211: "Evolved Universal Terrestrial Radio Access (E-UTRA); Physical channels and modulation". For open-loop spatial multiplexing transmission, PMI reporting is not supported.

As has been described above, the Physical Uplink Shared CHannel (PUSCH) may be used to transmit an aperiodic CQI report, which may be triggered by a special bit (CQI trigger) in the Physical Downlink Command Channel (PDCCH) grant. Usually, in case a data buffer at the UE is non-empty, user data and CQI are multiplexed with each other.

The PDCCH contains a field, the Modulation Code Scheme (MCS) level, ranging exemplarily from 0 to 31, as illustrated in Table 6 below, which points to a row in the MCS/Transport Block Set (TBS) table. This example will serve as a basis for the description of the invention in the following. The resulting TBS and code rate can be computed from the entries in the MCS table and the number of granted resource blocks (RB). The modifications used depending on the allocation size, i.e., the number of allocated resource blocks, are omitted for the sake of simplicity.

TABLE 6

| MCS Index | modulation | coding rate × 1024 | efficiency | Comments | Code Rate |
|---|---|---|---|---|---|
| 0 | 2 | 120 | 0.2344 | from CQI table | 0.1171875 |
| 1 | 2 | 157 | 0.3057 | Average Efficiency | 0.15332031 |
| 2 | 2 | 193 | 0.377 | from CQI table | 0.18847656 |
| 3 | 2 | 251 | 0.4893 | Average Efficiency | 0.24511719 |
| 4 | 2 | 308 | 0.6016 | from CQI table | 0.30078125 |
| 5 | 2 | 379 | 0.7393 | Average Efficiency | 0.37011719 |
| 6 | 2 | 449 | 0.877 | from CQI table | 0.43847656 |
| 7 | 2 | 526 | 1.0264 | Average Efficiency | 0.51367188 |
| 8 | 2 | 602 | 1.1758 | from CQI table | 0.58789063 |
| 9 | 2 | 679 | 1.3262 | Average Efficiency | 0.66308594 |
| 10 | 4 | 340 | 1.3262 | overlap | 0.33203125 |
| 11 | 4 | 378 | 1.4766 | from CQI table | 0.36914063 |
| 12 | 4 | 434 | 1.69535 | Average Efficiency | 0.42382813 |
| 13 | 4 | 490 | 1.9141 | From CQI table | 0.47851563 |
| 14 | 4 | 553 | 2.1602 | Average Efficiency | 0.54003906 |
| 15 | 4 | 616 | 2.4063 | from CQI table | 0.6015625 |
| 16 | 4 | 658 | 2.5684 | Average Efficiency | 0.64257813 |
| 17 | 6 | 438 | 2.5684 | overlap | 0.42773438 |
| 18 | 6 | 466 | 2.7305 | from CQI table | 0.45507813 |
| 19 | 6 | 517 | 3.0264 | Average Efficiency | 0.50488281 |
| 20 | 6 | 567 | 3.3223 | from CQI table | 0.55371094 |
| 21 | 6 | 616 | 3.6123 | Average Efficiency | 0.6015625 |
| 22 | 6 | 666 | 3.9023 | from CQI table | 0.65039063 |
| 23 | 6 | 719 | 4.21285 | Average Efficiency | 0.70214844 |
| 24 | 6 | 772 | 4.5234 | from CQI table | 0.75390625 |
| 25 | 6 | 822 | 4.8193 | Average Efficiency | 0.80273438 |
| 26 | 6 | 873 | 5.1152 | from CQI table | 0.85253906 |
| 27 | 6 | 910 | 5.33495 | Average Efficiency | 0.88867188 |
| 28 | 6 | 948 | 5.5547 | from CQI table | 0.92578125 |
| 29 | | | | DL: Implicit TBS signaling with QPSK UL: Transmission using RV1 | |
| 30 | | | | DL Implicit TBS signaling with 16QAM UL: Transmission using RV2 | |
| 31 | | | | DL: Implicit TBS signaling with 64QAM UL: Transmission using RV3 | |

In the Table 6 represented above, the MCS indexes 0 to 28 require an extra 2 bits for the coding of the Redundancy Version (RV) on the Downlink (DL). For the Uplink (UL), the RV parameter having the value 0 (RV0) is implicitly used.

It is desirable to define a control signalling scheme, which allows to request a terminal to transmit an aperiodic CQI report to a base station, wherein the report only contains CQI information, i.e., without multiplexing the CQI information with Uplink Shared CHannel data, even in case the data buffer at the terminal is non-empty. In this way, the base station would have an improved control on the content and error resilience of the aperiodic CQI report.

SUMMARY OF THE INVENTION

One object of the present invention is to suggest control signaling in a communication system that allows to trigger the independent transmission of a Channel Quality Indicator by a terminal without spoiling resources. Further, a corresponding base station and terminal are to be provided.

The object is solved by the subject matter of the independent claims. Advantageous embodiments of the invention are subject matter of the dependent claims.

One main aspect of the invention is to use a selected transport format for CQI report in a predetermined reporting mode just in selected conditions. More generally, a control channel signal from a base station to a terminal is defined, which comprises a selected transport format, which is to be used by the terminal for user data transmission to the base station. The transport format is selected so that it has a minimum impact on the system. The interpretation of the selected transport format by the terminal depends on a CQI trigger signal comprised in the control channel signal.

One embodiment of the invention provides a method for providing control signalling in a communication system, comprising the steps performed by a base station of the communication system of generating a control channel signal comprising a transport format and a channel quality indicator trigger signal for triggering a transmission of a channel quality indicator by at least one terminal to the base station, and transmitting the generated control channel signal to at least one terminal, wherein said transport format is a predetermined format for user data transmission by the at least one terminal to the base station and said control channel signal indicates a predetermined mode for reporting the channel quality indicator to the base station, wherein the channel quality indicator transmission is to be triggered by the at least one terminal based on the channel quality indicator trigger signal.

Another embodiment of the invention provides a method for use in a communication system, said method comprising the steps performed by a terminal of the communication system of receiving, from a base station of the communication system, a frame of physical radio resources comprising a control channel signal destined to the terminal, wherein the control channel signal comprises a predetermined transport format and a channel quality indicator trigger signal for triggering a transmission of a channel quality indicator by the terminal to the base station, wherein said transport format is a predetermined format for user data transmission by the at least one terminal to the base station and said control channel signal indicates a predetermined mode for reporting the channel quality indicator to the base station, said method further comprising transmitting a channel quality indicator to the base station using the indicated predetermined mode, wherein the channel quality indicator transmission is triggered based on the channel quality indicator trigger signal.

According to an embodiment of the invention, in case data are to be transmitted by the terminal to the base station, said data are buffered upon reception of said control channel signal, and the terminal waits for a signal from the base station before resuming data transmission.

According to a preferred embodiment of the invention, the indicated predetermined mode for reporting the channel quality indicator is an aperiodic channel quality indicator reporting mode, wherein the aperiodic channel quality indicator is to be transmitted by the at least one terminal to the base station without multiplexing with user data.

According to an embodiment of the invention, the predetermined transport format indicates a redundancy version parameter of a user data retransmission by the at least one terminal, wherein the channel quality indicator transmission is to be triggered by the at least one terminal for a predetermined value of the redundancy version parameter.

Preferentially, the predetermined value of the redundancy version parameter corresponds to a redundancy version that is infrequently used for data retransmission.

According to another embodiment of the invention, the predetermined transport format is selected among a plurality of transport formats having a same spectral efficiency. According to yet another embodiment of the invention, the predetermined transport format is selected among a plurality of transport formats such that the selected predetermined transport format is associated with a code rate that is equal to or larger than a predetermined code rate.

According to an embodiment of the invention, the control channel signal contains information on resource blocks used for the transmission from the at least one terminal to the base station, and the transmission of the channel quality indicator using the predetermined mode is to be triggered only in case said information on the resource blocks indicates a number of resource blocks that is smaller or equal to a predetermined resource block number.

Another embodiment of the invention provides a base station, comprising generating means for generating a control channel signal comprising a transport format and a channel quality indicator trigger signal for triggering a transmission of a channel quality indicator by at least one terminal to the base station, and transmitting means for transmitting the generated control channel signal to at least one terminal, wherein said transport format is a predetermined format for user data transmission by the at least one terminal to the base station and said control channel signal indicates a predetermined mode for reporting the channel quality indicator to the base station, wherein the channel quality indicator transmission is to be triggered by the at least one terminal based on the channel quality indicator trigger signal.

Another embodiment of the invention provides a terminal, comprising receiving means for receiving, from a base station, a frame of physical radio resources comprising a control channel signal destined to the terminal, wherein the control channel signal comprises a predetermined transport format and a channel quality indicator trigger signal for triggering a transmission of a channel quality indicator by the terminal to the base station, wherein said transport format is a predetermined format for user data transmission by the at least one terminal to the base station and said control channel signal indicates a predetermined mode for reporting the channel quality indicator to the base station, said terminal further comprising transmitting means for transmitting a channel quality indicator to the base station using the indicated predetermined mode, wherein the channel quality indicator transmission is triggered based on the channel quality indicator trigger signal.

Moreover, the invention according to other exemplary embodiments relates to the implementation of the methods described herein in software and hardware. Accordingly, another embodiment of the invention provides a computer readable medium for storing instructions that, when executed by a processor of a base station, cause the base station to generate a control channel signal comprising a transport format and a channel quality indicator trigger signal for triggering a transmission of a channel quality indicator by at least one terminal to the base station, and transmit the generated control channel signal to at least one terminal, wherein said transport format is a predetermined format for user data transmission by the at least one terminal to the base station and said control channel signal indicates a predetermined mode for reporting the channel quality indicator to the base station, wherein the channel quality indicator transmission is to be triggered by the at least one terminal based on the channel quality indicator trigger signal.

A further embodiment relates to a computer readable medium storing instructions that, when executed by a processor of a terminal, cause the mobile terminal to receive, from a base station, a frame of physical radio resources comprising a control channel signal destined to the terminal, wherein the control channel signal comprises a predetermined transport format and a channel quality indicator trigger signal for triggering a transmission of a channel quality indicator by the terminal to the base station, wherein said transport format is a predetermined format for user data transmission by the at least one terminal to the base station and said control channel signal indicates a predetermined mode for reporting the channel quality indicator to the base station, and transmit a channel quality indicator to the base station using the indicated predetermined mode, wherein the channel quality indicator transmission is triggered based on the channel quality indicator trigger signal.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 1:
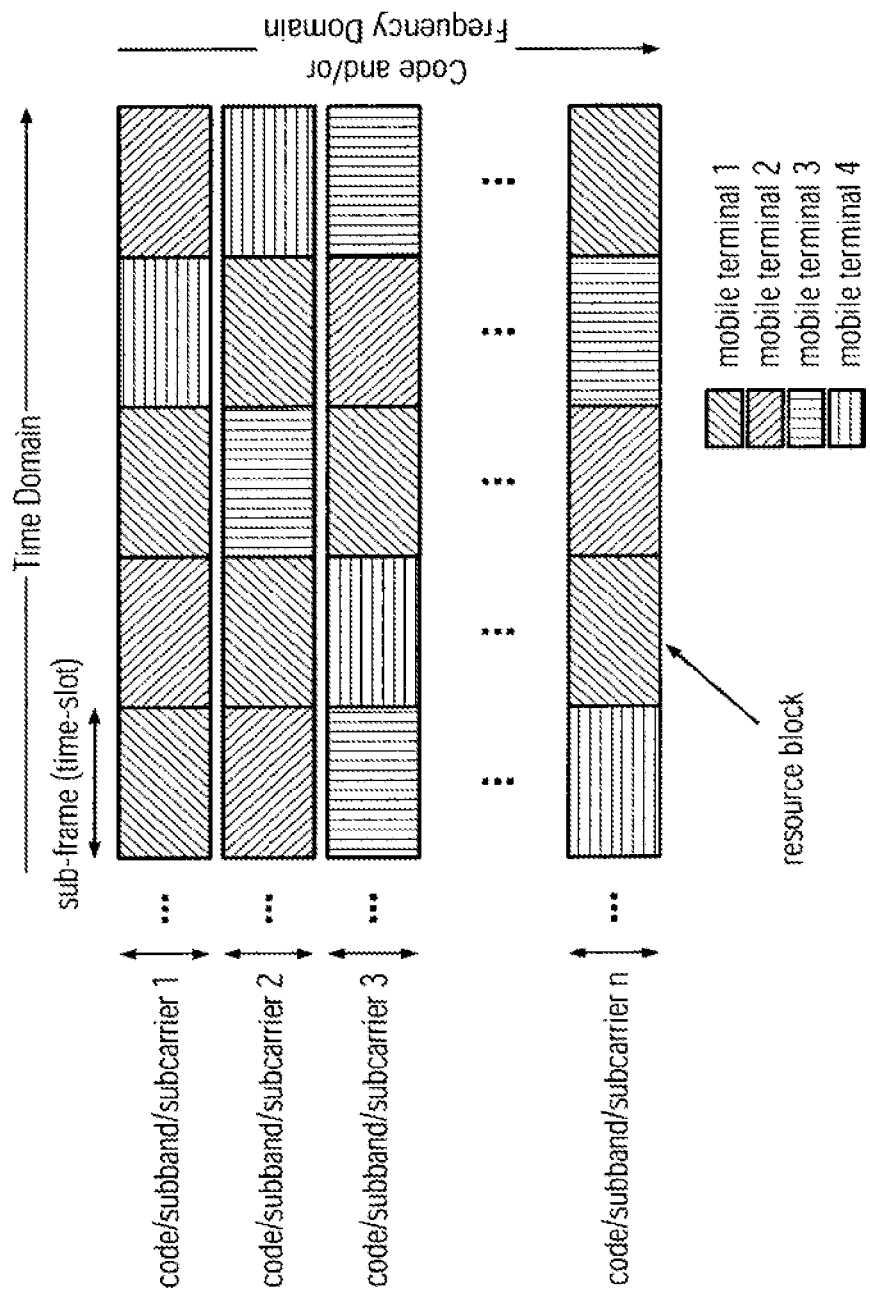
FIG. 1 shows an exemplary data transmission to users in an OFDMA system in localized mode (LM) having a distributed mapping of L1/L2 control signaling.

The following paragraphs will describe various embodiments of the invention. For exemplary purposes only, most of the embodiments are outlined in relation to an (evolved) UMTS communication system according to the SAE/LTE discussed in the Technical Background section above. It should be noted that the invention may be advantageously used, for example, in connection with a mobile communication system such as the SAE/LTE communication system previously described or in connection with multi-carrier systems such as OFDM-based systems, but the invention is not limited to its use in this particular exemplary communication network. In particular, the invention can be implemented in any type of communication system comprising a base station and a terminal, not necessarily a mobile terminal. For instance, a desktop PC with a UMTS/LTE card may serve as a terminal. Alternatively, the terminal may be collocated within an access station (static) for the last mile transmission using other than UMTS/LTE system.

Before discussing the various embodiments of the invention in further detail below, the following paragraphs will give a brief overview on the meaning of several terms frequently used herein and their interrelation and dependencies.

In general, the transport format (TF) in 3GPP defines the modulation and coding scheme (MCS) and/or the transport block (TB) size, which is applied for the transmission of a transport block and is, therefore, required for appropriate (de)modulation and (de)coding. The L1/L2 control signaling may only need to indicate either the transport block size or the modulation and coding scheme. In case the modulation and coding scheme should be signaled, there are several options how to implement this signaling. For example, separate fields for modulation and coding or a joint field for signaling both, the modulation and coding parameters may be foreseen. In case the transport block size (TBS) should be signaled, the transport block size is typically not explicitly signaled, but is rather signaled as a TBS index. The interpretation of the TBS index to determine the actual transport block size may, for example, depend on the resource allocation size.

In the following, the transport format field on the L1/L2 control signaling is assumed to be indicating either the modulation and coding scheme or the transport block size. It should be noted, that the transport block size for a given transport block typically does not change during transmissions. However, even if the transport block size is not changed, the modulation and coding scheme may change between transmissions, e.g., if the resource allocation size is changed (as apparent for the described relationship above).

It should be also noted that in some embodiments of the invention, for retransmissions the transport block size is typically known from the initial transmission. Therefore, the transport format (MCS and/or TBS) information (even if the modulation and coding scheme changes between transmissions) does not have to be signaled in retransmissions, since the modulation and coding scheme can be determined from the transport block size and the resource allocation size, which can be determined from the resource allocation field.

Figure 4:
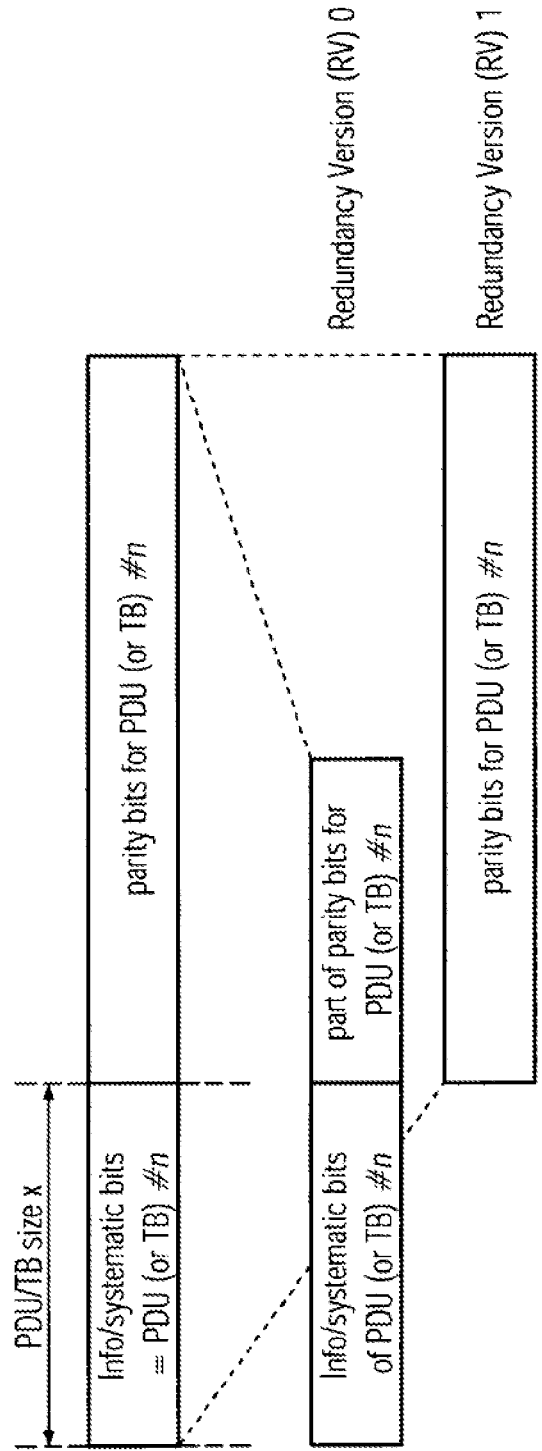

A redundancy version denotes a set of encoded bits generated from a given transport block, as shown in FIG. 4. In systems, where the code rate for the data transmission is generated by a fixed rate encoder and a rate matching unit (e.g., in HSDPA of UMTS or LTE systems), different redundancy versions are generated for a single transport block (or protocol data unit) by selecting different sets of available encoded bits, where the set size (number of selected bits) depends on the actual code rate (CR) for the data transmission. In case the actual code rate for a transmission (or retransmission) is higher than the encoder rate, a redundancy version is constructed out of a subset of encoded bits. In case the actual code rate for a transmission (or retransmission) is lower than the encoder rate, a redundancy version is typically constructed out of all encoded bits with selected bits being repeated. It should be noted that the figure is simplified for easier understanding. The actual content of the redundancy version may differ from the depicted case. For example, RV0 may contain only part of or all systematic bits as well as only part or all of parity bits. Likewise, RV1 and other RVs are not constrained to contain only non-systematic bits.

It should be noted that for simplicity it is referred to transport format and redundancy version in most of the examples herein. However, in all embodiments of this invention the term "transport format" means either one of "transport format", "transport block size", "payload size" or "modulation and coding scheme". Similarly, in all embodiments of this invention the term "redundancy version" can be replaced by "redundancy version and/or constellation version".

The present invention aims at providing a possibility for signaling a Channel Quality Indicator (CQI) reporting mode with impact as small as possible on the scalability of resource allocation and signaling of other control parameters. In particular, the CQI reporting mode relates to an aperiodic reporting of CQI that is not multiplexed with user data even if the buffer is not empty, which will be further referred to as "CQI-only mode".

From a certain perspective, a PMI is not fundamentally different from a CQI—the PMI suggests basically a precoding to use for good exploitation of the physical resource, and a CQI suggests basically an MCS or TBS as mentioned previously to the same end. Therefore, it should be obvious to those skilled in the art that any following description of the invention with respect to CQI can be easily adapted mutatis mutandis to be used for PMI, or combinations thereof or with other information.

A main idea of the invention relies on using a predetermined transport format for signalizing the CQI-only reporting mode only in selected conditions. Accordingly, a control channel signal from a base station to a terminal is defined, which comprises the predetermined transport format.

The control channel signal further comprises a CQI trigger signal for triggering a transmission of a CQI by the terminal. The interpretation of the selected transport format by the terminal depends on the status of one or more CQI trigger bits in the CQI trigger signal comprised in the control channel signal. In case the CQI trigger signal indicates to the terminal to transmit a CQI report and the value of transport format parameter corresponds to the predetermined value, the terminal interprets this combination as a command to transmit such CQI in the predetermined mode, i.e., here the CQI-only mode, to the base station. If, on the other hand, the value of transport format parameter does not correspond to the predetermined value, even if CQI trigger is set, the terminal will interpret the CQI trigger as well as the transport format parameter in their usual meaning. Those skilled in the art will recognize that this usual meaning may be a multiplexing of CQI with user data in an uplink transmission.

The main advantage of the invention relies in that the overall structure and content of the MCS/TBS table is preserved for Uplink and Downlink. An MCS level is not spent completely for signalling the CQI reporting mode. Full flexibility for Downlink is retained and full flexibility for Uplink data-only transmission, i.e., without multiplexing CQI, is retained as well. Further, the invention allows to implement a CQI-only reporting mode without wasting a whole MCS level or any other unconditional value of any other parameter. This provides more flexibility for the Uplink scheduler, which results in better spectral efficiency.

According to a preferred embodiment of the invention, the indicated predetermined mode for reporting the channel quality indicator is an aperiodic channel quality indicator reporting mode, wherein the aperiodic channel quality indicator is to be transmitted by the terminal to the base station without multiplexing with user data. This thus allows for signalling to the terminal to transmit a so-called "CQI-only" report to the base station.

A preferred embodiment of the invention will be described in the following by referring to the MCS entries illustrated in the example of Table 6.

Since the CQI report is present in uplink only, the MCS table entries 29-31 shown in Table 6 are used for signalling the redundancy version (RV) of a retransmission. Usually, without a grant for a retransmission, the ordered sequence of RV parameters for transmissions is established to achieve the best decoding performance using the least number of transmissions. For LTE/SAE, said ordered sequence has been established as RV={0, 2, 3, 1}, since the use of the RV parameters 2 and 3 before using the RV parameter 1 has a better performance. As a result, the RV parameter 1 is usually the least frequently used RV value, and consequently RV1 is the least frequently used redundancy version.

Hence, according to a preferred embodiment of the invention, only the reception of a control channel signal signalling a predetermined RV value, preferentially the RV value 1, together with a CQI trigger signal and a predetermined MCS index (transport format parameter value), will be interpreted by the terminal as meaning that a CQI-only report shall be transmitted to the base station on PUSCH. In case a control channel signal signalling the RV parameter 1 is received by the terminal without a CQI trigger signal, the terminal interprets it as meaning that a transmission using the RV parameter 1 shall be performed.

This is summarized in the following Table 7, where the predetermined transport format selected is the MCS entry 29:

TABLE 7

| MCS Index | Interpretation |
| --- | --- |
| 0-28 | As before (MCS/TBS, . . .) |
| 29 | DL: Implicit TBS signaling with QPSK<br>UL with CQI Trigger: CQI-only transmission (=no data)<br>UL without CQI Trigger: Transmission using RV1 |
| 30 | DL: Implicit TBS signaling with 16QAM<br>UL: Transmission using RV2 |
| 31 | DL: Implicit TBS signaling with 64QAM<br>UL: Transmission using RV3 |

The basic idea of the invention is further extensible by using other conditional parameter values additionally to the transport format (e.g., MCS index) and CQI trigger. This enables even higher efficiency of resource utilization.

A further embodiment of the invention will now be described in the following.

The control channel signal contains information on resource blocks used for the transmission from the terminal to the base station on the PUCCH. The transmission of the channel quality indicator CQI using the predetermined mode defined above is to be triggered by the terminal only in case the information on the resource blocks indicates a number of resource blocks that is smaller or equal to a predetermined resource block number.

Indeed, the signalling of CQI-only mode is advantageous for small resource block assignments, since the coding rate for large resource block assignments CQI-only would become unnecessarily low. Hence, according to this embodiment of the invention, the terminal shall transmit a CQI without multiplexing with user data only for a small number of resource block assignments.

An example will be presented in the following for illustration purposes by referring to Table 8. In this example, the RV parameter is selected to be 1 as illustrated above. Even though 10 resource blocks is chosen herewith, this is meant only for exemplary purposes and any other value could be chosen instead.

TABLE 8

| MCS Index | Interpretation |
|---|---|
| 0-28 | As before (MCS/TBS, . . .) |
| 29 | DL: Implicit TBS signaling with QPSK<br>UL CQI Trigger Set, <=10 RBs assigned:<br>CQI-only transmission (=no data)<br>UL CQI Trigger Set, >10 RBs assigned:<br>Transmission using RV1, multiplexing of data and CQI<br>UL without CQI Trigger: Transmission using RV1 |
| 30 | DL: Implicit TBS signaling with 16QAM<br>UL: Transmission using RV2 |
| 31 | DL: Implicit TBS signaling with 64QAM<br>UL: Transmission using RV3 |

As apparent from Table 8, the transmission of a CQI-only is triggered by the terminal only when the CQI trigger signal is signalled and the RV is set to 1 (corresponding to MCS index value of 29) and if the number of assigned resource blocks is smaller than or equal to 10. In case the number of assigned resource blocks is larger than 10, even if the CQI trigger signal is signalled, the terminal will not transmit a CQI-only but will transmit the CQI report along with multiplexed data, using, for example, the redundancy version parameter having a value of 1.

Furthermore, a UE experiencing good channel conditions, i.e., being assigned a large MCS, is likely to be allocated a lot of Resource Blocks, so that it is preferable to not lose flexibility for those cases by interpreting such a signal as meaning CQI-only. Consequently, it may be preferable to use the cases where a number of Resource Blocks are allocated to a terminal greater than a predetermined threshold Resource Block value and an MCS value that is representing a spectral efficiency below a predetermined MCS or spectral efficiency threshold value to signal a CQI-only transmission.

An alternative embodiment of the invention will now be presented in the following by referring to Table 9, which, instead of using the predetermined RV parameter value, and preferentially the RV1 entry, proposes to use one of two transport formats, i.e., MCS indexes signalizing the modulation and coding combination, in the example of Table 9, that have an identical spectral efficiency.

TABLE 9

| MCS Index | Modulation | Coding rate × 1024 | Efficiency |
|---|---|---|---|
| 0 | 2 | 120 | 0.2344 |
| 1 | 2 | 157 | 0.3057 |
| 2 | 2 | 193 | 0.377 |
| 3 | 2 | 251 | 0.4893 |
| 4 | 2 | 308 | 0.6016 |
| 5 | 2 | 379 | 0.7393 |
| 6 | 2 | 449 | 0.877 |
| 7 | 2 | 526 | 1.0264 |
| 8 | 2 | 602 | 1.1758 |
| 9 (DL) | 2 | 679 | 1.3262 |
| 9 (UL without CQI trigger) | 2 | 679 | 1.3262 |
| 9 (UL with CQI trigger) | CQI-only transmission (=no data) | | |
| 10 | 4 | 340 | 1.3262 |
| 11 | 4 | 378 | 1.4766 |
| 12 | 4 | 434 | 1.69535 |
| 13 | 4 | 490 | 1.9141 |
| 14 | 4 | 553 | 2.1602 |
| 15 | 4 | 616 | 2.4063 |
| 16 | 4 | 658 | 2.5684 |
| 17 | 6 | 438 | 2.5684 |
| 18 | 6 | 466 | 2.7305 |

TABLE 9-continued

| MCS Index | Modulation | Coding rate × 1024 | Efficiency |
|---|---|---|---|
| 19 | 6 | 517 | 3.0264 |
| 20 | 6 | 567 | 3.3223 |
| 21 | 6 | 616 | 3.6123 |
| 22 | 6 | 666 | 3.9023 |
| 23 | 6 | 719 | 4.21285 |
| 24 | 6 | 772 | 4.5234 |
| 25 | 6 | 822 | 4.8193 |
| 26 | 6 | 873 | 5.1152 |
| 27 | 6 | 910 | 5.33495 |
| 28 | 6 | 948 | 5.5547 |
| 29 | DL: Implicit TBS signaling with QPSK<br>UL: Transmission using RV1 | | |
| 30 | DL: Implicit TBS signaling with 16QAM<br>UL: Transmission using RV2 | | |
| 31 | DL: Implicit TBS signaling with 64QAM<br>UL: Transmission using RV3 | | |

As apparent from Table 9, the MCS entries 9 and 10 have an identical spectral efficiency of 1.3262. Further, the MCS entries 16 and 17 each have the same spectral efficiency of 2.5684. Such overlapping entries (in terms of spectral efficiency) are foreseen, since a higher modulation scheme is more beneficial in a frequency-selective environment (see 3GPP RAN1 meeting 49bis R1-073105, "Downlink Link Adaptation and Related Control Signalling" for more details).

The transmission of an independent CQI report without multiplexed data is more advantageous for small resource block assignments, where the channel is rather flat. Hence, an MCS entry representing a higher-order modulation scheme with the same spectral efficiency as an MCS entry representing a lower spectral efficiency should be replaced. For example, with respect to Table 6, the respective "upper" MCS entry, i.e., 10 or 17, should be replaced.

The transmission of a CQI report with multiplexed data costs Uplink data redundancy. In order to multiplex data and CQI, some redundancy that is added for the data part by means of forward error correction coding has to be taken out to make room for the CQI. Obviously, the more redundancy is added, the easier and less notable is it to take out a few bits for the to-be-multiplexed CQI. The "upper" entries have more redundancy to offer than the "lower", so it is less likely that a "lower" entry can support multiplexing a CQI report with data efficiently. In extreme cases, the added redundancy for the data could be smaller than what is necessary for a CQI. In such a case, multiplexing CQI could raise the resulting coding rate for the data above 1, since it is not sufficient to remove added redundancy, but systematic information has to be removed. This would result in an automatic transmission failure for the data, since the receiver cannot reconstruct the whole data from the received information. Therefore, an MCS entry that offers more redundancy than another MCS entry is preferably replaced to be used for a CQI-only transmission. Consequently, in relation to Table 6 the "lower" MCS entries 9 or 16 can be advantageously replaced and used for the transmission of a CQI report without multiplexed data.

Furthermore, the embodiment described with respect to Table 8 can be applied and used in combination with the embodiment described with respect to Table 9.

In general, any MCS index value may be used in combination with a CQI trigger to signal the CQI-only reporting mode. As another example, it may be beneficial to replace an MCS entry associated with a very small spectral efficiency, such as MCS Index 0 in Table 6, in conjunction with a set CQI trigger signal to trigger a CQI-only report. In such a case, since a very small spectral efficiency is replaced, the loss for the system in terms of how much data is not transmitted, since there is no data to be multiplexed with the CQI, is negligible.

Another alternative embodiment of the invention will now be presented in the following by referring to Table 10, which, instead of using the predetermined RV parameter, and preferentially the RV1 entry, proposes to select a predetermined transport format that is associated with a high code rate.

TABLE 10

| MCS Index | Modulation | Coding rate × 1024 | Efficiency |
|---|---|---|---|
| 0 | 2 | 120 | 0.2344 |
| 1 | 2 | 157 | 0.3057 |
| 2 | 2 | 193 | 0.377 |
| 3 | 2 | 251 | 0.4893 |
| 4 | 2 | 308 | 0.6016 |
| 5 | 2 | 379 | 0.7393 |
| 6 | 2 | 449 | 0.877 |
| 7 | 2 | 526 | 1.0264 |
| 8 | 2 | 602 | 1.1758 |
| 9 | 2 | 679 | 1.3262 |
| 10 | 4 | 340 | 1.3262 |
| 11 | 4 | 378 | 1.4766 |
| 12 | 4 | 434 | 1.69535 |
| 13 | 4 | 490 | 1.9141 |
| 14 | 4 | 553 | 2.1602 |
| 15 | 4 | 616 | 2.4063 |
| 16 | 4 | 658 | 2.5684 |
| 17 | 6 | 438 | 2.5684 |
| 18 | 6 | 466 | 2.7305 |
| 19 | 6 | 517 | 3.0264 |
| 20 | 6 | 567 | 3.3223 |
| 21 | 6 | 616 | 3.6123 |
| 22 | 6 | 666 | 3.9023 |
| 23 | 6 | 719 | 4.21285 |
| 24 | 6 | 772 | 4.5234 |
| 25 | 6 | 822 | 4.8193 |
| 26 | 6 | 873 | 5.1152 |
| 27 | 6 | 910 | 5.33495 |
| 28 (DL) | 6 | 948 | 5.5547 |
| 28 (UL without CQI trigger) | 6 | 948 | 5.5547 |
| 28 (UL with CQI trigger) | CQI-only transmission (=no data) | | |
| 29 | DL: Implicit TBS signaling with QPSK UL: Transmission using RV1 | | |
| 30 | DL: Implicit TBS signaling with 16QAM UL: Transmission using RV2 | | |
| 31 | DL: Implicit TBS signaling with 64QAM UL: Transmission using RV3 | | |

Instead of using the predetermined RV parameter, and preferentially the RV1 entry, as described in the embodiment above, an MCS entry associated with a high code rate is used, according to the present embodiment, for reporting a CQI report only. As apparent from Table 10, the selected MCS entry 28 is associated with a code rate that is equal to or larger than a predetermined code rate.

Indeed, multiplexed CQI costs Uplink data redundancy. Since an MCS entry that offers a high code rate provides very little redundancy, multiplexing a CQI report with data at such a high code rate is relatively expensive, as already mentioned herein before. Consequently, according to this embodiment of the invention, an MCS entry associated with a high code rate such as the MCS entry 28 in Table 6 can be advantageously replaced and used for transmitting a CQI report only without multiplexing with data.

Furthermore, the embodiment described with respect to Table 8 can be applied and used in combination with the embodiment described with respect to Table 10.

In accordance with the present invention, also another parameter can be additionally set to signal the desired CQI reporting mode, preferentially the signalling of an independent CQI report. Examples of other possible parameters could be, among others, an antenna parameter (MIMO), a HARQ process number, a Constellation Number of a Modulation or another parameter.

In another embodiment, a CQI-only report may be signalled by using multiple signals, e.g., in time or frequency domain. For example, setting the CQI trigger in two consecutive sub-frames could trigger a CQI-only report. As another example, assigning an MCS entry assigned with a low spectral efficiency to a terminal in consecutive sub-frames can be used to trigger a CQI-only report.

In another embodiment, the MCS entry replaced to trigger a CQI-only report in conjunction with a set CQI trigger signal is selected depending on different terminal capability classes. Generally, a communication system supports different classes of terminal capabilities. For example, some terminals may not support the transmission of 64-QAM in the uplink. Consequently, for such terminals any MCS associated with a modulation scheme of 64-QAM is usually meaningless. Therefore, for such terminals a set CQI trigger signal in conjunction with an MCS entry which is not within the scope of the terminal's capability can be used to trigger a CQI-only report. Terminals that support the full scope are preferably employing any of the other embodiments described herein.

In the previous embodiments, the term "predetermined" is used to describe e.g., a value with a special meaning that is known to both sides of a communication link. This can be a fixed value in a specification, or a value that is negotiated between both ends e.g., by other control signalling.

In the following, the amendments to the Hybrid Automatic Repeat reQuest (HARQ) operation induced by the definition of the control channel signalling according to the invention will be presented.

Since the triggering of a CQI-only report prevents the PUSCH from being used for data transmission in the usual way, the HARQ operation is influenced as well. First, the principles governing HARQ operation in uplink will be summarized. Then, an amended HARQ protocol operation according to the invention will be described.

A Physical HARQ Indicator CHannel (PHICH) carrying ACK/NACK messages for an Uplink data transmission may be transmitted at the same time as a Physical Downlink Command CHannel PDCCH for the same terminal. With such simultaneous transmission, the terminal follows what the PDCCH asks the terminal to do, i.e., performs a transmission or a retransmission (referred to as adaptive retransmission), regardless of the PHICH content. When no PDCCH for the terminal is detected, the PHICH content dictates the HARQ behaviour of the terminal, which is summarized in the following.

NACK: the terminal performs a non-adaptive retransmission, i.e., a retransmission on the same uplink resource as previously used by the same process.

ACK: the terminal does not perform any Uplink (re) transmission and keeps the data in the HARQ buffer for that HARQ process. A further transmission for that HARQ process needs to be explicitly scheduled by a subsequent grant by PDCCH. Until the reception of such grant, the terminal is in a "Suspension state."

This is illustrated in the following Table 11:

TABLE 11

| HARQ feedback seen by the UE (PHICH) | PDCCH seen by the UE | UE behaviour |
|---|---|---|
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |

The Uplink HARQ protocol behaviour corresponding to the reception of a PDCCH requesting a "CQI-Only" amended according to the invention will now be described.

Upon reception of a control channel signal requesting the transmission of an independent CQI report, the terminal considers the received CQI-only carrying PDCCH as an ACK and goes into "suspension state." The terminal does not perform any Uplink (re)transmission from the MAC point of view and keeps the data in the HARQ buffer, if any data is pending for retransmission. A PDCCH at the next occurrence of the HARQ process is then required to perform a retransmission or initial transmission, i.e., a non-adaptive retransmission cannot follow. In this way, the behaviour of a CQI-only on the PDCCH is treated by the UE in the same way as an ACK on the PHICH without a PDCCH.

The amended HARQ protocol operation at the terminal is summarized in the following Table 12:

TABLE 12

| HARQ feedback seen by the UE (PHICH) | PDCCH seen by the UE | UE behaviour |
|---|---|---|
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |
| ACK or NACK | "CQI-Only" | No (re)transmission, keep data in HARQ buffer and a PDDCH is required to resume retransmissions |

Figure 5:
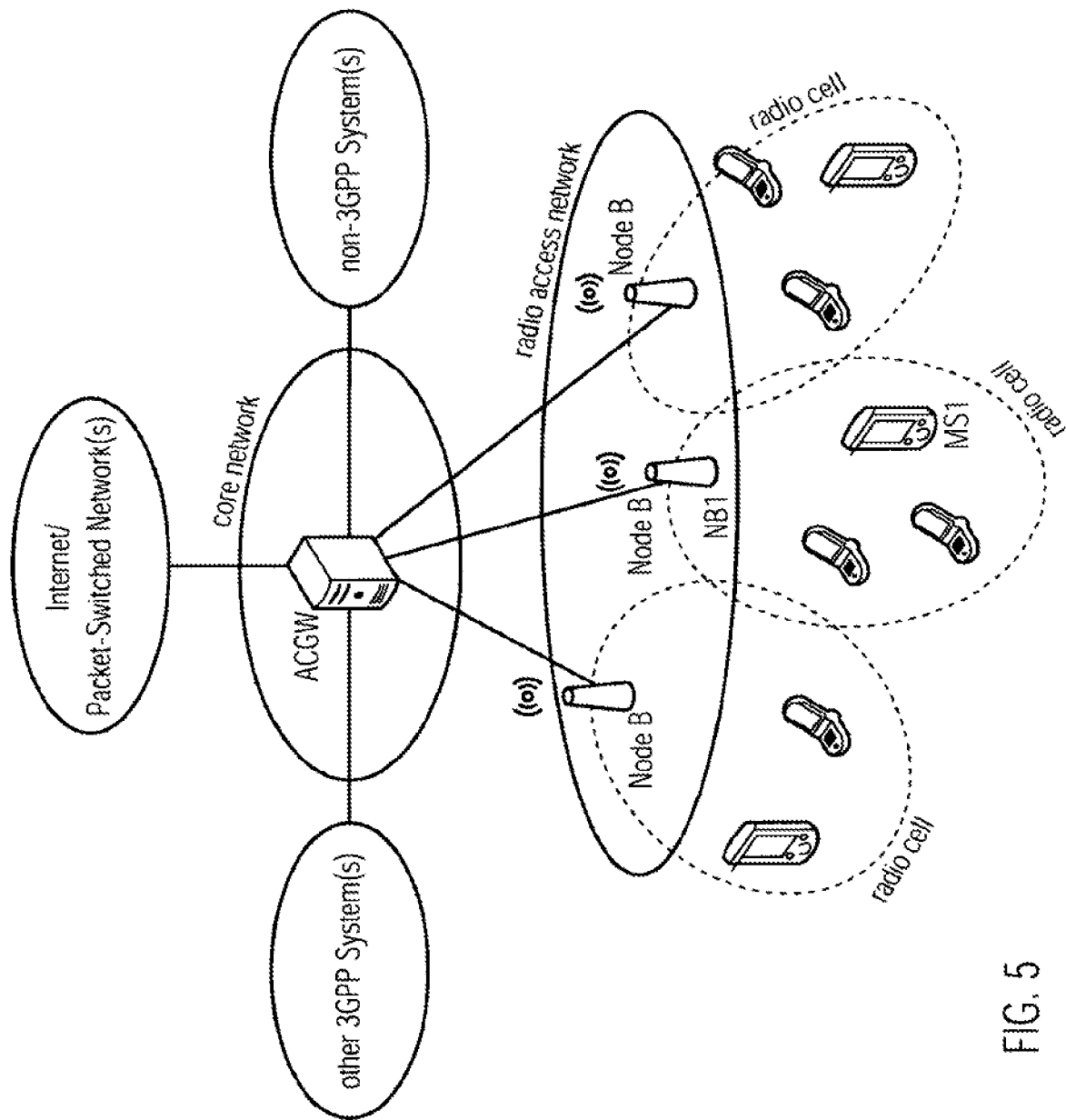
FIG. 5 shows a mobile communication system according to one embodiment of the invention, in which the ideas of the invention may be implemented.

Next, the operation of the transmitter of the control channel signal according to one of the various embodiments described herein and the receiver thereof will be described in further detail, thereby exemplarily relating to the case of downlink data transmission. For exemplary purposes a mobile network as exemplified in FIG. 5 may be assumed. The mobile communication system of FIG. 5 is considered to have a "two node architecture" consisting of at least one Access and Core Gateway (ACGW) and Node Bs. The ACGW may handle core network functions, such as routing calls and data connections to external networks, and it may also implement some RAN (Radio Access Network) functions. Thus, the ACGW may be considered as to combine functions performed by GGSN (Gateway GPRS Support Node) and SGSN (Serving GPRS Support Node) in today's 3 G networks and RAN functions as, for example, radio resource control (RRC), header compression, ciphering/integrity protection.

The base stations (also referred to as Node Bs or enhanced Node Bs=eNode Bs) may handle functions as, for example, segmentation/concatenation, scheduling and allocation of resources, multiplexing and physical layer functions, but also RRC functions, such as outer ARQ. For exemplary purposes only, the eNodeBs are illustrated to control only one radio cell. Obviously, using beam-forming antennae and/or other techniques the eNodeBs may also control several radio cells or logical radio cells.

Figure 2:
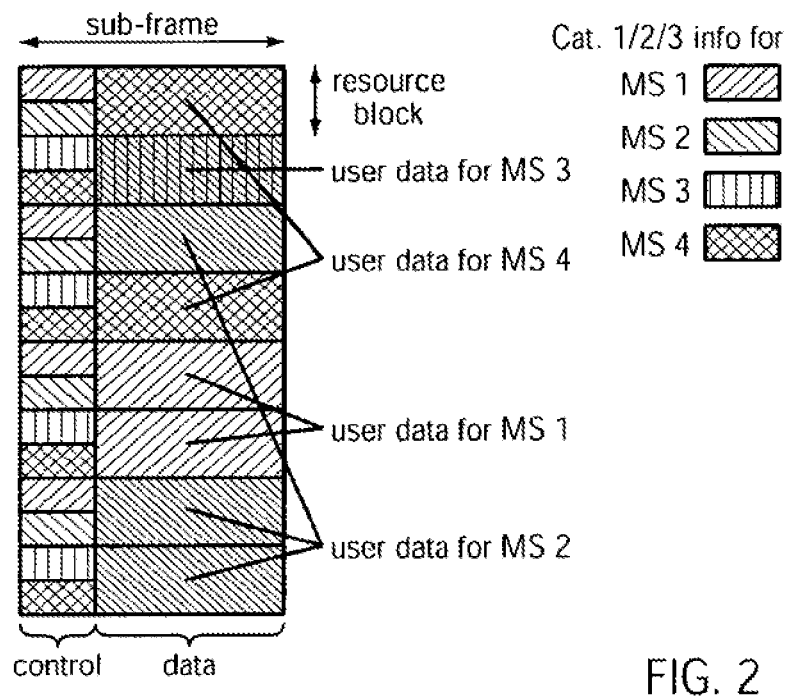
FIG. 2 shows an exemplary data transmission to users in an OFDMA system in localized mode (LM) having a distributed mapping of L1/L2 control signaling.
Figure 3:
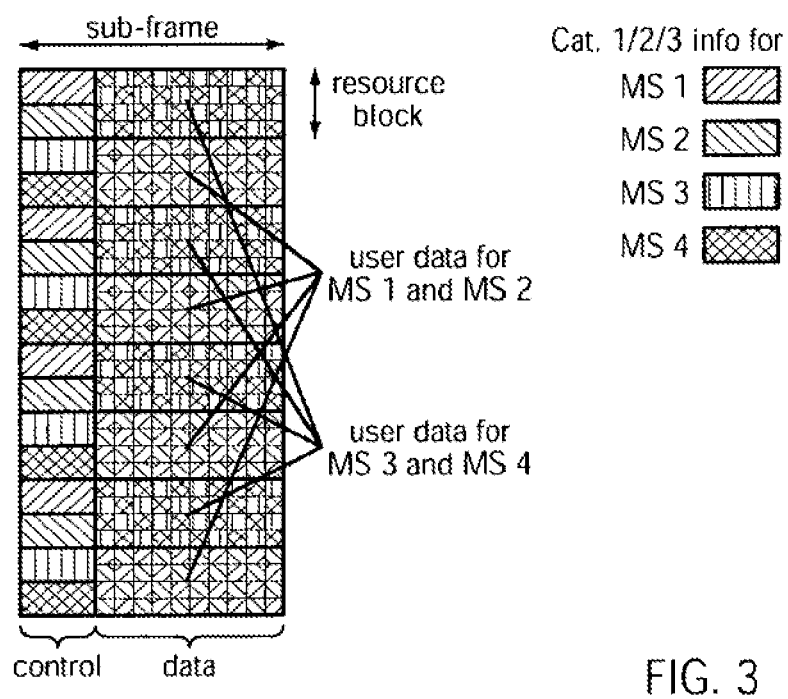
FIG. 3 shows an exemplary data transmission to users in an OFDMA system in distributed mode (DM) having a distributed mapping of L1/L2 control signaling, FIG. 4 exemplarily highlights the interrelation between transport block/protocol data unit and its different redundancy versions as well as the transport block size/protocol data unit size.

In this exemplary network architecture, a shared data channel may be used for communication of user data (in form or protocol data units) on uplink and/or downlink on the air interface between mobile stations (UEs) and base stations (eNodeBs). This shared channel may be, for example, a Physical Uplink or Downlink Shared CHannel (PUSCH or PDSCH) as know in LTE systems. However, it is also possible that the shared data channel and the associated control channels are mapped to the physical layer resources as shown in FIG. 2 or FIG. 3.

The control channel signals/information may be transmitted on separate (physical) control channels that are mapped into the same subframe to which the associated user data (protocol data units) are mapped or may be alternatively sent in a subframe preceding the one containing the associated information. In one example, the mobile communication system is a 3GPP LTE system, and the control channel signal is L1/L2 control channel information (e.g., information on the Physical Downlink Control CHannel—PDCCH). Respective L1/L2 control channel information for the different users (or groups of users) may be mapped into a specific part of the shared uplink or downlink channel, as exemplarily shown in FIGS. 2 and 3, where the control channel information of the different users is mapped to the first part of a downlink subframe ("control").

Another embodiment of the invention relates to the implementation of the above described various embodiments using hardware and software. It is recognized that the various embodiments of the invention may be implemented or performed using computing devices (processors). A computing device or processor may, for example, be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc.

Furthermore, it should be noted that the terms terminal, mobile terminal, MS and mobile station are used as synonyms herein. A user equipment (UE) may be considered one example for a mobile station and refers to a mobile terminal for use in 3GPP-based networks, such as LTE. Moreover, the terminal is not limited to a mobile station, it can be, e.g., a PC card or a fixed access point of another system.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

The invention claimed is:

1. A terminal, comprising:
a receiver, which, in operation, receives control channel signals transmitted by a base station, the control channel signals including a modulation and coding scheme (MCS) index, uplink resource block assignment information and a channel quality indicator trigger; and
a transmitter, which, in operation, transmits a channel quality indicator report to the base station in response to the channel quality indicator trigger, wherein a transmission mode of the channel quality indicator report is selected from a plurality of channel quality indicator report transmission modes based on a comparison of a number of resource blocks indicated by the uplink resource block assignment information to a threshold number of resource blocks.

2. The terminal of claim 1, comprising a buffer, which, in operation, buffers data to be transmitted to the base station in response to reception of the control channel signals, and the transmitter, in operation, waits for a signal from the base station before resuming data transmission.

3. The terminal of claim 1 wherein the plurality of channel quality indicator report transmission modes include an aperiodic channel quality indicator reporting mode, in which the transmitter, in operation, transmits an aperiodic channel quality indicator to the base station without multiplexing the aperiodic channel quality indicator with user data in an uplink transport block.

4. The terminal of claim 3 wherein the control channel signals indicate a redundancy/constellation version parameter of a user data retransmission and the transmitter, in operation, transmits the channel quality indicator report using the aperiodic channel quality indicator reporting mode in response to the redundancy/constellation version parameter being equal to a determined value.

5. The terminal of claim 4 wherein the determined value of the redundancy/constellation version parameter is 1.

6. The terminal of claim 1 wherein the plurality of channel quality indicator report transmission modes have a same indication of spectral efficiency.

7. The terminal of claim 1 wherein the plurality of channel quality indicator report transmission modes are associated with code rates that are equal to or larger than a threshold code rate.

8. A method, comprising:
receiving, by a terminal, control channel signals transmitted by a base station, the control channel signals including a modulation and coding scheme (MCS) index, uplink resource block assignment information and a channel quality indicator trigger;
selecting, by the terminal, a channel quality indicator report transmission mode from a plurality of channel quality indicator report transmission modes based on a comparison of a number of resource blocks indicated by the uplink resource block assignment information to a threshold number of resource blocks; and
transmitting, by the terminal and using the selected channel quality indicator report transmission mode, a channel quality indicator report to the base station in response to the channel quality indicator trigger.

9. The method of claim 8, comprising:
buffering data to be transmitted to the base station in response to reception of the control channel signals; and
waiting for a signal from the base station before resuming data transmission.

10. The method of claim 8 wherein the plurality of channel quality indicator report transmission modes include an aperiodic channel quality indicator reporting mode, in which the transmitter, in operation, transmits an aperiodic channel quality indicator to the base station without multiplexing the aperiodic channel quality indicator with user data in an uplink transport block.

11. The method of claim 10 wherein the control channel signals indicate a redundancy/constellation version parameter of a user data retransmission and the aperiodic channel quality indicator reporting mode is selected in response to the redundancy/constellation version parameter being equal to a determined value.

12. The method of claim 11 wherein the determined value of the redundancy/constellation version parameter is 1.

13. The method of claim 8 wherein the plurality of channel quality indicator report transmission modes have a same indication of spectral efficiency.

14. The method of claim 8 wherein the plurality of channel quality indicator report transmission modes are associated with code rates that are equal to or larger than a threshold code rate.

* * * * *